US006834311B2

(12) United States Patent
Rao

(10) Patent No.: US 6,834,311 B2
(45) Date of Patent: Dec. 21, 2004

(54) METHOD, SYSTEM, AND PROGRAM FOR ENABLING COMMUNICATION BETWEEN DEVICES USING DYNAMIC ADDRESSING

(75) Inventor: Raghavendra Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 799 days.

(21) Appl. No.: 09/826,080

(22) Filed: Apr. 4, 2001

(65) Prior Publication Data

US 2002/0147843 A1 Oct. 10, 2002

(51) Int. Cl.[7] .............................................. G06F 15/16
(52) U.S. Cl. ...................... 709/245; 709/226; 709/227; 709/229; 370/352; 370/355
(58) Field of Search ................................ 709/200–203, 709/218, 226–229, 238–239, 245–246; 370/351–356, 401, 432, 395.52, 395.53, 395.54

(56) References Cited

U.S. PATENT DOCUMENTS

| | | | | |
|---|---|---|---|---|
| 5,835,723 | A | * 11/1998 | Andrews et al. | 709/226 |
| 5,974,452 | A | * 10/1999 | Karapetkov et al. | 709/218 |
| 6,081,836 | A | * 6/2000 | Karapetkov et al. | 709/245 |
| 6,137,799 | A | * 10/2000 | Karapetkov et al. | 370/395.53 |
| 6,148,004 | A | 11/2000 | Nelson et al. | 370/463 |
| 6,209,023 | B1 | 3/2001 | Dimitroff et al. | 709/211 |
| 6,321,255 | B1 | * 11/2001 | May et al. | 709/245 |
| 6,542,935 | B1 | * 4/2003 | Ishii | 709/245 |
| 6,681,259 | B1 | * 1/2004 | Lemilainen et al. | 709/227 |
| 6,687,755 | B1 | * 2/2004 | Ford et al. | 709/245 |
| 6,741,585 | B1 | * 5/2004 | Munoz et al. | 370/352 |
| 6,772,210 | B1 | * 8/2004 | Edholm | 709/245 |

FOREIGN PATENT DOCUMENTS

WO       0101257       1/2001    ......... G06F/12/00

OTHER PUBLICATIONS

Clark, Tom. "Designing Storage Area Networks *A Practical Reference for Implementing Fibre Channel SANs*", 1999.pp, 23–88.
Fibre Channel Working Group. "Private Loop SCSI Direct Attach (FC–PLDA)" Revision 2.1, Reference # NCITS TR–19, Sep. 22, 1997, pp. iii–84.

\* cited by examiner

*Primary Examiner*—Bharat Barot
(74) *Attorney, Agent, or Firm*—Meyertons Hood Kivlin Kowert & Goetzel P.C.; B Noël Kivlin

(57) ABSTRACT

Provided is a computer implemented method, system, and program for enabling communication between one network device that is a member of a first set of network devices that communicate using a first address format and one network device that is a member of a second set of network devices that communicate using a second address format. One frame is received from a first network device in the first set, wherein the frame is part of a first exchange of multiple frames between the first network device and one network device in the second set. A first address in the second address format is allocated to the first network device to use to communicate with the network device of the second set during the first exchange of the frames. One frame is also received from a second network device that is a member of the first set pursuant to a second exchange of multiple frames between the second network device and one network device in the second set. One address in the second address format is allocated to the second network device to use to communicate during the second exchange of frames. The address in the second address format allocated to the second network device is capable of comprising the first address or a second address in the second address format.

57 Claims, 11 Drawing Sheets

METHOD, SYSTEM, AND PROGRAM FOR ENABLING COMMUNICATION BETWEEN DEVICES USING DYNAMIC ADDRESSING

BACKGROUND OF THE INVENTION

1. Field of the Invention

The present invention relates to a method, system, and program for enabling communication between devices using dynamic addressing 2. Description of the Related Art A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. One common protocol for enabling communication among the various SAN devices is the Fibre Channel protocol, which uses optical fibers to connect devices and provide high bandwidth communication between the devices. In Fibre Channel terms the "fabric" comprises one or more switches, such as cascading switches, that connect the devices. The link is the two unidirectional fibers, which may comprise an optical wire, transmitting to opposite directions with their associated transmitter and receiver. Each fiber is attached to a transmitter of a port at one end and a receiver of another port at the other end.

The Fibre Channel protocol defines a fabric topology. A fabric includes one or more switches, each switch having multiple ports, also referred to as F_Ports. A fiber link may connect an N_Port, or node port, on a device to one F_Port on the switch. N_Port refers to any port on a non-switch device. An N_Port can communicate with all other N_Ports attached to the fabric to which the N_Port is connected, i.e., N_Ports on the immediate switch or interconnected cascading switches.

Another common Fibre Channel topology is the loop. The devices in a arbitrated loop are daisy chained together. An L_Port is a port on a device that has arbitrated loop capabilities. An NL_Port is a device port that is part of a loop and capable of communicating with other N_Ports in a fabric. An FL_Port is a switch port connected to a loop. FIG. 1 illustrates an arbitrated loop where the lead from the NL_Port on one device connects to the receiving NL_Port of one other device, all the way until the NL_Port of the last device connects to the receiver NL_Port of the first device in the port. FIG. 1 illustrates a private loop topology where no loop device is connected to a switch. FIG. 2 illustrates an example of a public loop where a switch FL_Port is connected to the arbitrated loop, thereby allowing communication between the fabric devices and the loop devices.

In the Fibre Channel architecture, N_Ports and NL_Ports have a 24 bit port address. In a private loop where there is no switch, the upper two bytes of the address are zeroed to x'00 00'. If the loop is attached to a fabric, i.e., switch and the NL_Port supports fabric login, then the switch assigns the loop identifier that is common to all NL_Ports on the loop as the upper two bytes of the loop device (NL_Port).

In both public and private loops, the last byte of the address is the Arbitrated Loop Physical Address (AL_PA), which identifies the device in the loop.

Numerous installed Fibre Channel configurations utilize a private arbitrated loop, including servers and storage arrays. In the prior art, efforts have been undertaken to allow fabric devices to communicate with private loop devices. This may be desirable to incorporate private loops into larger networks and to allow for scalability of the device population and increase the transmission distance. This is especially important because, as mentioned, must currently installed Fibre Channel configurations are arbitrated private loop configurations.

One technique that may be used to integrate fabric devices into an arbitrated private loop would be to upgrade all the private loop devices to have a 24 bit address, just like the fabric or public loop devices. However, such an upgrade operation would be a substantial undertaking given the number of installed private arbitrated loops. Moreover, many users may be hesitant to perform an upgrade because of concerns that such an upgrade could upset a current satisfactory system configuration. For instance, an upgrade may involve changes to low level software or firmware of the device. System administrators may be inclined against such changes that could have a substantial impact on the entire system performance, especially if the system contains sensitive or very critical data.

Another technique to allow communication between private loop devices and fabric devices involves performing a loop initialization procedure (LIP) to assign the fabric device an 8 bit arbitrated loop address (AL_PA) on the private loop. Loop initialization (LIP) allows new participants onto the private loop, assigns the AL_PAs, and provides notification of topology changes. The fabric device would then use the assigned private loop AL_PA to participate in the private loop just as if the fabric device is physically connected to the private loop. The private loop devices would view the fabric device assigned the 8 bit AL_PA as another private loop device having an 8 bit AL_PA address, even though the fabric device is in fact connected to a switch and uses the full 24 bit address, and may communicate with other fabric devices using the 24 bit address.

An FL_Port on the switch connected to the private loop would facilitate communication between the fabric devices assigned the 8 bit AL_PA with the private loop devices. The FL_Port on the switch would perform all the functions necessary to obtain the 8 bit private loop address (AL_PA) for the fabric device. Further, when the private loop device transmits a frame destined for the fabric device, the switch port would translate the 8 bit AL_PA of the private loop device in the destination ID field (DID) into the 24 bit fabric address the switch assigned to the transmitting private loop device. The FL_Port would perform similar translation for frames communicated from the fabric device to the private loop device.

One disadvantage of the prior art technique of performing a loop initialization (LIP) to assign each fabric device that wants to communicate on the private loop a private loop AL_PA is that performing the LIP operation will disrupt all the current private loop operations and perform a whole new assignment of addresses to the private loop devices. Further, the FL_Port on the switch connected to the private loop would have to provide notification of the AL_PA changes to all registered nodes in the fabric including the switch, which is disruptive to the fabric devices receiving such notification because they have to perform re-authentication. Further, these notifications may cause a network storm and clutter the network bandwidth. Thus, granting a fabric device access to the private loop by performing a loop initialization (LIP) and assigning the fabric device the 8 bit private loop AL_PA disrupts both the private loop devices and fabric devices. Further details of the Fibre Channel protocol and attaching private arbitrated loops to a switch are described in the publication "Designing Storage Area Networks: A Practical reference for Implementing Fibre Channel SANs", by Tom Clark (Addison Wesley Longman, 1999), which publication is incorporated herein by reference in its entirety.

Thus, there is a need in the art for improved techniques for allowing fabric devices attached to a switch to communicate with private loop devices.

SUMMARY OF THE DESCRIBED IMPLEMENTATIONS

Provided is a computer implemented method, system, and program for enabling communication between one network device that is a member of a first set of network devices that communicate using a first address format and one network device that is a member of a second set of network devices that communicate using a second address format. One frame is received from a first network device in the first set, wherein the frame is part of a first exchange of multiple frames between the first network device and one network device in the second set. A first address in the second address format is allocated to the first network device to use to communicate with the network device of the second set during the first exchange of the frames. One frame is also received from a second network device that is a member of the first set pursuant to a second exchange of multiple frames between the second network device and one network device in the second set. One address in the second address format is allocated to the second network device to use to communicate during the second exchange of frames. The address in the second address format allocated to the second network device is capable of comprising the first address or a second address in the second address format.

Still further, allocating the address in the second address format to one exchange further comprises indicating that the allocated address is assigned to the exchange and after the exchange has completed, indicating that the allocated address is not allocated to one active exchange. The address indicated as not allocated to one active exchange is capable of being allocated to a subsequent exchange.

Yet further, a determination is made of one address in the second format that was least recently allocated to one active exchange. In such case, the second address allocated to the second exchange is the least recently allocated address.

In further implementations, the second set of network devices comprises an arbitrated loop, such as a private arbitrated loop, attached to a switch. The first network device is capable of communicating with one port on the switch. Still further, the network devices and switch may communicate using the Fibre Channel protocol,

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
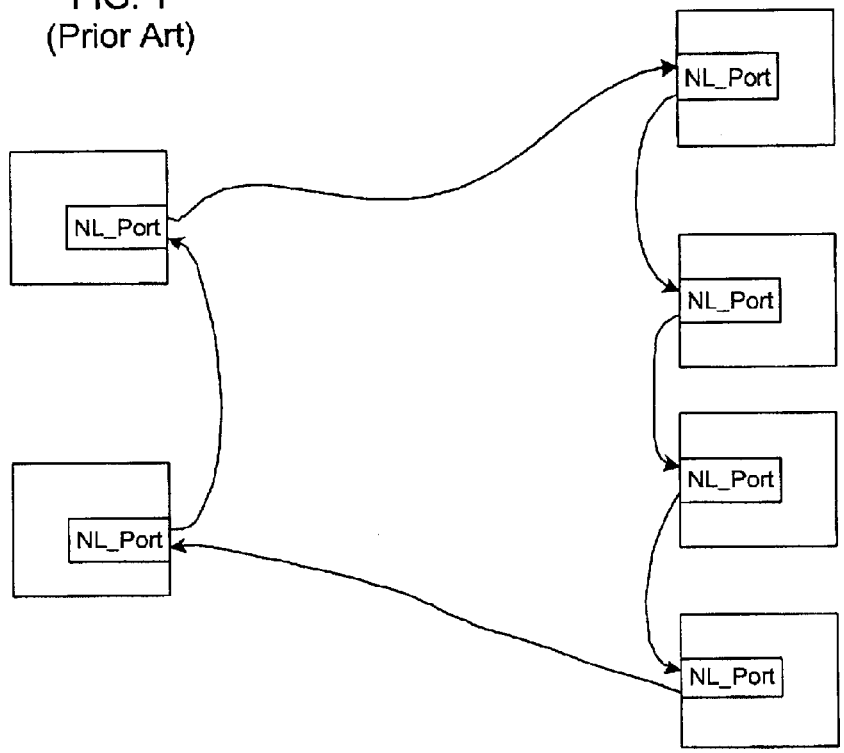
FIGS. 1 and 2 illustrate prior art topologies of devices connected using the Fibre Channel protocol.
Figure 2:
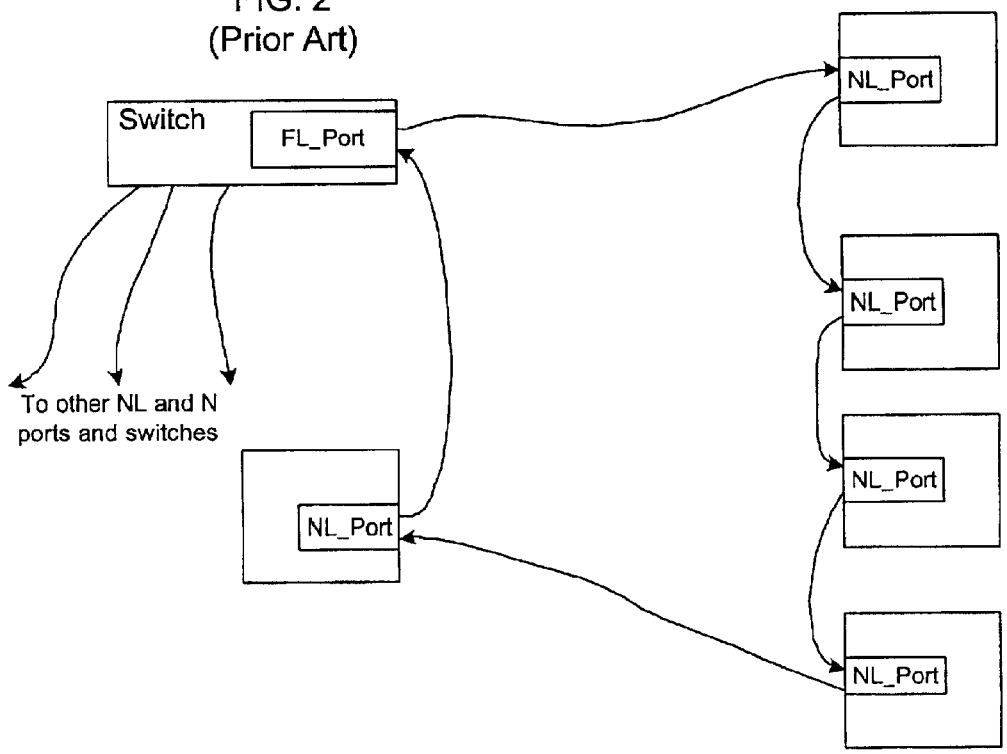
Figure 3:
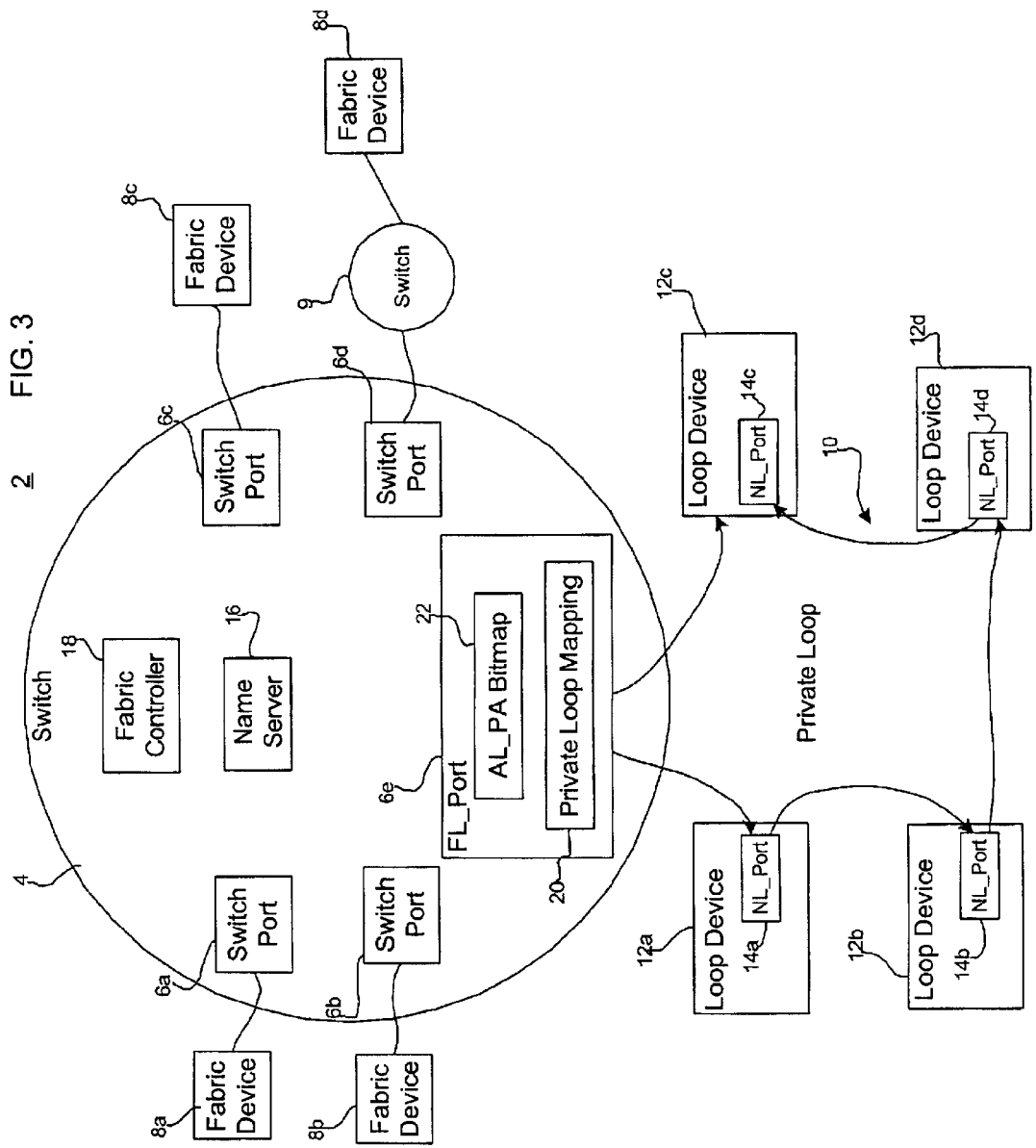
FIG. 3 illustrates a topology of network devices in accordance with certain implementations of the invention.

FIG. 3 illustrates an example of a Fibre Channel network storage topology 2 in which the invention may be implemented. A switch 4 includes multiple switch ports 6a, b, c, d, e. Fabric devices 8a, b, c are attached to the switch ports 6a, b, c, respectively, and fabric device 8d connects to the switch 4 through switch 9, which is attached to port 6d, illustrating a cascading switch arrangement. Each fabric device 8a, b, c, d and the switch 9 includes Fibre Channel ports to communicate with the switch port 6a, b, c, d. The fabric devices 8a, b, c, d may comprise any computing device known in the art, e.g., a server, workstation, mainframe, personal computer, etc., that include Fibre Channel compliant node ports (N_Port) or NL_Ports if the device is part of a loop. The switch ports 6a, b, c, d, e and port on switch 9 (not shown) comprise Fibre Channel compliant FL_Ports. Any switch port 6a, b, c, d, e, such as port 6e, attached to an arbitrated loop comprises an FL_Port. In the described implementation, FL_Port 6e is attached to private loop 10 having loop devices 12a, b, c, d. A fabric comprises the interconnected switches 4 and 9 and any devices and loops attached thereto.

Each device that is part of a loop includes an NL_Port. The loop devices 12a, b, c, d include NL_Ports 14a, b, c, d. In the described implementations, each of the ports 6a, b, c, d, e and 14a, b, c, d comprise Fibre Channel ports that implement the Fibre Channel protocols known in the art and include code to execute the protocols of the implementations of the invention described herein. The FL_Port 6c functions as the gateway between the loop devices 12a, b, c, d and the fabric devices 8a, b, c, d.

The switch 4 further includes a name server 16 and fabric controller 18 in which the switch management logic is implemented. The name server 16 comprises a Fibre Channel name server including a database of objects. Each fabric attached device may register or query useful information in the name server 14, including, name, address and class of service capability of other participants. In alternative configurations, the switch 4 may include additional switch ports (F_Ports) to connect to any other number of switches, devices and public/private loops 18. Further details of the switch 4, 9 components are described in the publication entitled "Fibre Channel Switch Fabric-2 (FC-SW-2), Rev. 4.8", working draft proposal of ANSI (Oct. 27, 2000), which publication is incorporated herein by reference in its entirety.

The name server 16 identifies fabric devices 8a, b, c, d and loop devices 12a, b, c, d with a 24 bit address, including an 8 bit area field, an 8 bit domain field and an 8 bit port ID. The domain field provides an address for a group of one or more interconnected switches in a fabric. The area byte provides an address of a switch port to which the device is connected. If the device is part of an arbitrated loop, then the area byte provides a port address shared by devices on the loop. The combination of the domain and area bytes can identify a fabric loop, or a specific loop attached to a specific switch, such as private loop 10. The port ID provides a unique identifier of a port within a domain and area, or a unique address of a device on an arbitrated loop (L__Port), e.g., the address of the loop devices 12a, b, c, d on private loop 10.

In the topology of FIG. 3, loop 10 comprises a private loop. During a loop initialization process (LIP), the loop devices 12a, b, c, d would be assigned an 8 bit arbitrated loop physical addresses (AL__PAs). The internal address assignment used by the loop devices 12a, b, c, d are zeroed out. Thus, the loop devices 12a, b, c, d communicate with each other using the 8 bit AL__PA addresses assigned during the LIP. In fact, in many private arbitrated loops, the loop devices 8a, b, c, d, d can only recognize the 8 bit AL__PA and cannot communicate beyond the 8 bit address to a fabric device 8a, b, c, d assigned a 24 bit address by the switch 4.

During the loop initialization of the private loop 10, the FL__Port would function as the loop master to provide the assignment of the 8 bit AL__PA addresses to the loop devices 12a, b, c, d. The loop master further maintains an AL__PA bitmap 22 indicating the 8 bit AL__PA addresses assigned to the loop devices 12a, b, c, d. The FL__Port 6e would be assigned an AL__PA of hex "00". Further details of loop initialization are described in the publication "Fibre Channel Arbitrated Loop (FC-AL-2), Rev. 7.0", working draft proposal of ANSI (Apr. 1, 1999), which publication is incorporated herein by reference in its entirety. The FL__Port 6e would behave strictly like a private loop 10 member with respect to the private loop devices 12a, b, c, d and at the same time facilitate communication between fabric devices 8a, b, c, d and the private loop devices 12a, b, c, d. In this way, the private loop devices 12a, b, c, d are unaware that they are communicating with fabric devices 8a, b, c, d that utilize a 24 bit address to communicate as all the mapping and translation is handled by the FL__Port 6e.

In the described implementations, the switch 4 would discover the presence of the loop devices 12a, b, c, d and register in the name server 16 a 24 bit address for each private loop device 12a, b, c, d, where the domain and area fields would uniquely identify the private loop 10 as attached to the switch 4 and the port ID would comprise the AL__PA assigned to the private loop device 12a, b, c, d during the LIP performed by the private loop 10. The switch 4 would detect and register the private loop devices 12a, b, c, d as well as fabric devices 8a, b, c, d using Fibre Channel registration techniques known in the art. Thus, after registration with the switch 4, fabric devices 8a, b, c, d address the private loop devices 12a, b, c, d using the 24 bit address maintained in the name server 16, even though the private loop devices 12a, b, c, d can only use an 8 bit address to communicate. The name server 16 would also include information indicating that the loop devices 12a, b, c, d are private loop devices. A private loop mapping 20 provides a defined correspondence of 24 bit to 8 bit addresses to allow communication between fabric devices 8a, b, c, d and private loop devices 12a, b, c, d in the manner described below. In certain implementations, the private loop mapping 20 is maintained in the FL__Port 6e, which handles all mapping and translation between fabric devices 8a, b, c, d that use a 24 bit address to communicate and private loop devices 12a, b, c, d that use an 8 bit address to communicate.

Figure 4:
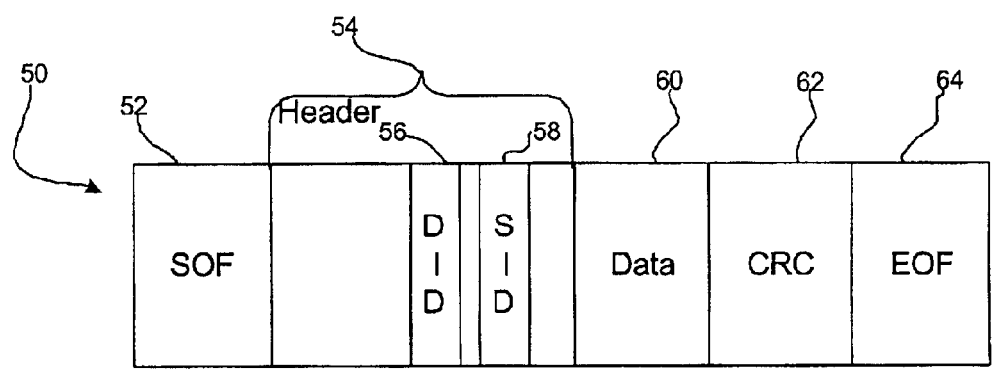
FIG. 4 illustrates the fields in a Fibre Channel frame for transferring data as known in the art.

In the Fiber Channel protocol, data and commands are communicated in frames. FIG. 4 illustrates the format of a frame 50, including:

Start of Frame (SOF) Delimiter 52: indicates a class of services requested and the sequence number of the frame in a series of related frames.

Header 54: includes source 56 and destination 58 identifiers or addresses, as well as various control fields known in the art.

Data Field 60: comprises the data being transmitted, which may be of variable length.

CRC 62: a cyclical redundancy check code to use to maintain data integrity.

End of Frame (EOF) Delimiter 64: indicates the end of the frame.

In order to communicate with the private loop devices 12a, b, c, d, the fabric devices 8a, b, c, d must perform a PLOGI to discover information and exchange service parameters with the loop devices 12a, b, c, d to determine the Fibre Channel services and class level supported by the loop devices 12a, b, c, d.

Figure 5:
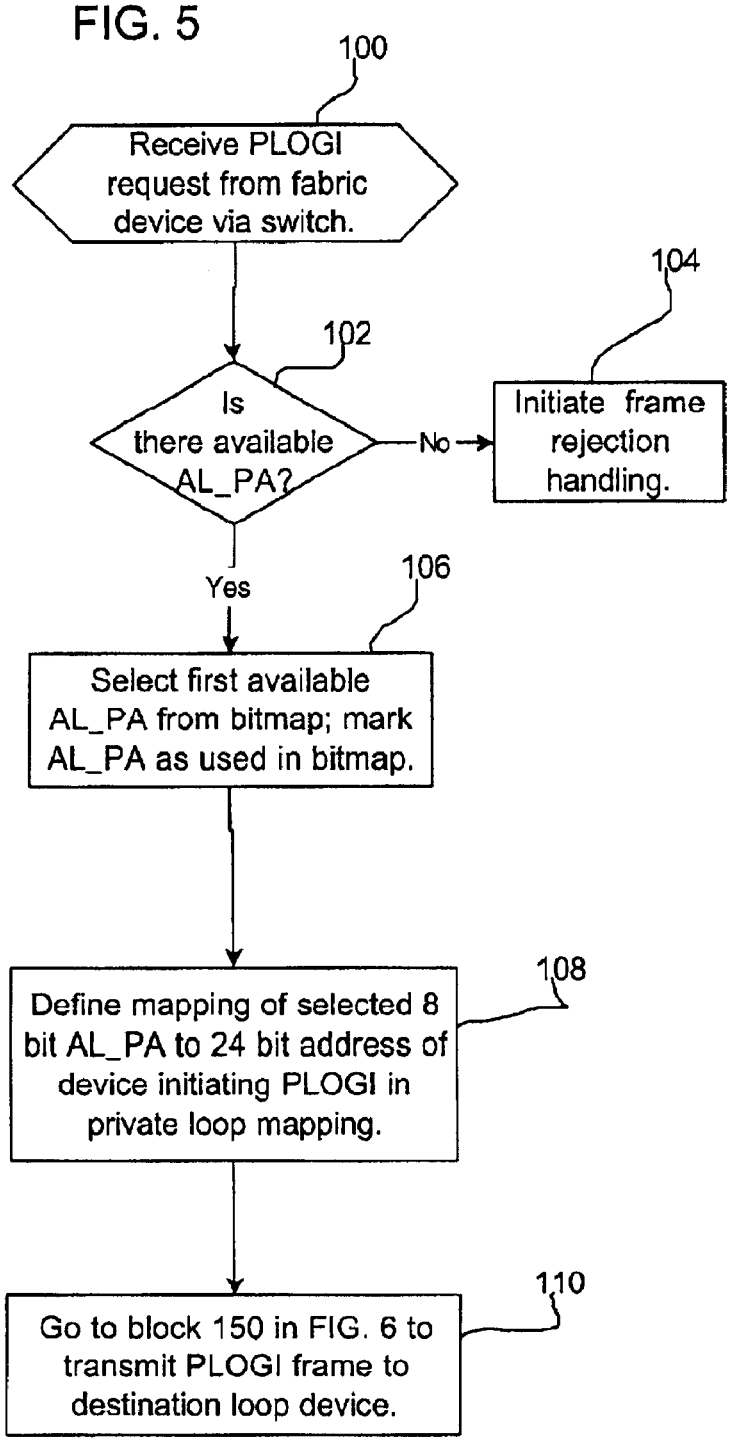
FIGS. 5–8 illustrate one implementation of logic embedded in a switch port to enable communication between fabric devices and private loop devices in accordance with certain implementations of the invention.

FIGS. 5, 6, 7, and 8 illustrate logic implemented in the FL__Port 6e to enable communication between the fabric devices 8a, b, c, d and private loop devices 12a, b, c, d. FIG. 5 illustrates logic implemented in the FL__Port 6e to establish a correspondence of an 8 bit address in the private loop 10 with a 24 bit address to enable communication between fabric devices 8a, b, c, d and private loop devices 12a, b, c, d. The FL__Port 6e may be implemented in hardware as an Application Specific Integrated Circuit (ASIC), including a buffer. Control begins at block 100 with the FL__Port 6e receiving a PLOGI request from one of the fabric devices 8a, b, c, d. The fabric device 8a, b, c, d would direct the PLOGI request to the private loop device 12a, b, c, d using the 24 bit address of the target private loop device 12a, b, c, d registered with the name server 16. The area field of the target private loop device 12a, b, c, d would identify the FL__Port 6e to enable the switch fabric controller 18 to route the PLOGI request to the FL__Port 6e to handle. The FL__Port 6e then determines (at block 102) whether an AL__PA in the private loop 10 is available. If not, then FL__Port 6e enters (at block 104) a frame rejection mode. Rejection mode may involve returning some code indicating that the switch 4 cannot deliver the frame or taking no action and letting the source fabric device 8a, b, c, d timeout. For instance, in one implementation, if the PLOGI request is for a class service other than class 3, then the FL__Port 6e may return an F__RJT code to the source fabric device 8a, b, c, d indicating that the frame is not acceptable. If the class service included in the PLOGI request is class 3, then the FL__Port 6e would ignore the request. A class 3 service does not require acknowledgment of frame delivery, unlike other class levels that require acknowledgment of frame delivery.

If (at block 102) an AL__PA is available in the AL__PA bitmap 22, then the F-Port 6e selects (at block 106) the first available address in the AL__PA bitmap 22, and then marks the selected address as used. The FL__Port 6e then defines (at block 108) in the private loop mapping 20 a correspondence of the selected 8 bit AL__PA to the 24 bit address of the fabric device 8a, b, c, d initiating the PLOGI request. The selected 8 bit AL__PA is used to represent and address the fabric device 8a, b, c, d in the private loop 10. Control then proceeds (at block 110) to block 150 in FIG. 6 to transmit the PLOGI frame to the destination loop device 12a, b, c, d using the address mapping in the private loop mapping 20.

Figure 6:
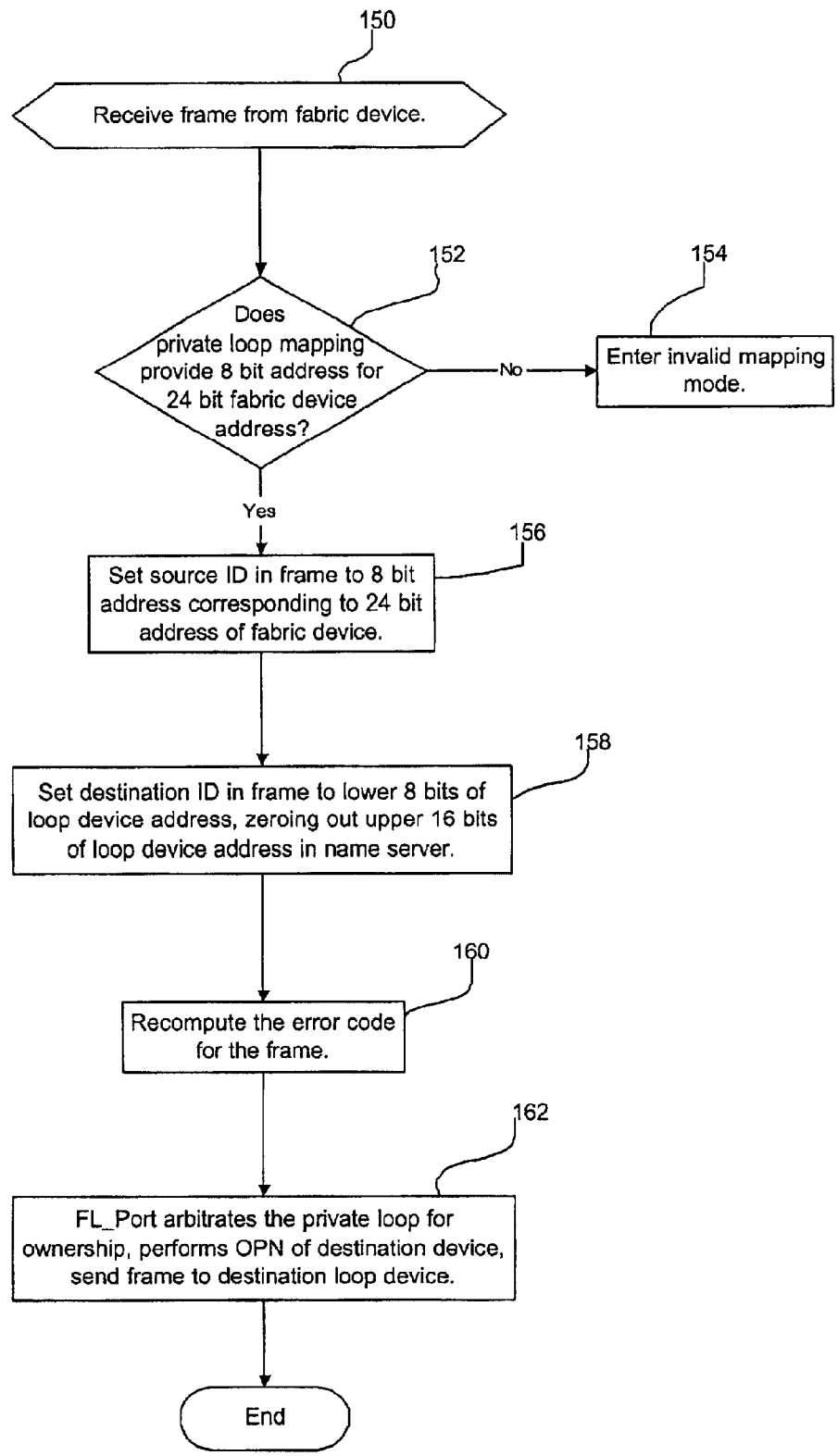

FIG. 6 illustrates logic implemented in the FL__Port 6e to forward frames from the fabric devices 8a, b, c, d to target private loop devices 12a, b, c, d. Control begins at block 150 with the FL__Port 6e receiving a frame from one fabric device 8a, b, c, d through the switch 4 to deliver to a private loop device 12a, b, c, d. If (at block 152) the private loop mapping 20 does not provide an 8 bit private loop 10 address for the 24 bit fabric device 8a, b, c, d address, then invalid mapping mode is entered (at block 154), where the FL_Port 6e returns a rejection code indicating the frame is not acceptable or ignores the frame. If (at block 152) the private loop mapping 20 provides an 8 bit loop address for the fabric device 8a, b, c, d transmitting the frame, then the FL_Port 6e sets (at block 156) the source ID (SID) 58 in the frame to the 8 bit address for the source fabric device 8a, b, c, d provided in the private loop mapping 20. The destination ID (DID) 56 is set (at block 158) to the lower 8 bits of the 24 bit loop device 12a, b, c, d address in the name server 16, where the upper 16 bits are zeroed out. The redundancy check code (CRC) 62 is recomputed (at block 160) with the new 8 bit destination 56 and source 58 IDs. At block 162, the FL_Port 6e then arbitrates the private loop 10 to obtain ownership of the destination loop device 12a, b, c, d, opens the destination NL_Port 14a, b, c, d on the destination loop device 12a, b, c, d, and then delivers the frame.

Figure 7:
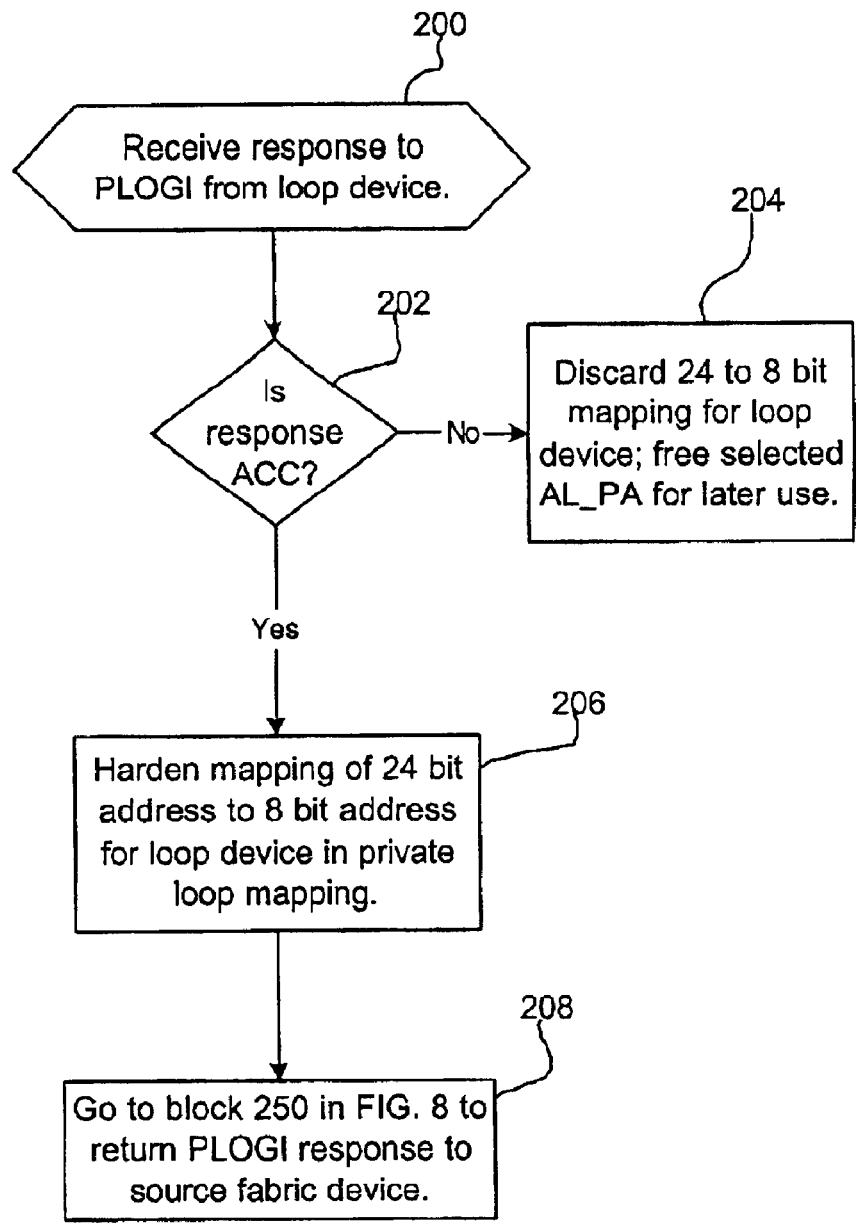

FIG. 7 illustrates logic implemented in the FL_Port 6e to handle the private loop device 12a, b, c, d response to the PLOGI. Upon receiving (at block 200) a response to the PLOGI request from the destination loop device 12a, b, c, d, the FL_Port 6e determines (at block 202) whether the response includes a PLOGI acknowledgment (ACC). If acknowledgment is not provided, then the FL_Port 6e discards (at block 204) the 24 to 8 bit mapping in the private loop mapping 20 and frees the selected AL_PA address in the AL_PA bitmap 22. Without maintaining the mapping of the 8 bit to 24 bit addresses for the fabric device 8a, b, c, d, the fabric device 8a, b, c, d cannot communicate with the private loop devices 12a, b, c, d. If (at block 202) acknowledgment (ACC) is received, then the FL_Port 6e hardens (at block 206) the 24 to 8 bit mapping for the fabric device 8a, b, c, d in the private loop mapping 20. Control then proceeds (at block 208) to block 250 in FIG. 8 to return the PLOGI response to the source fabric device 8a, b, c, d.

Figure 8:
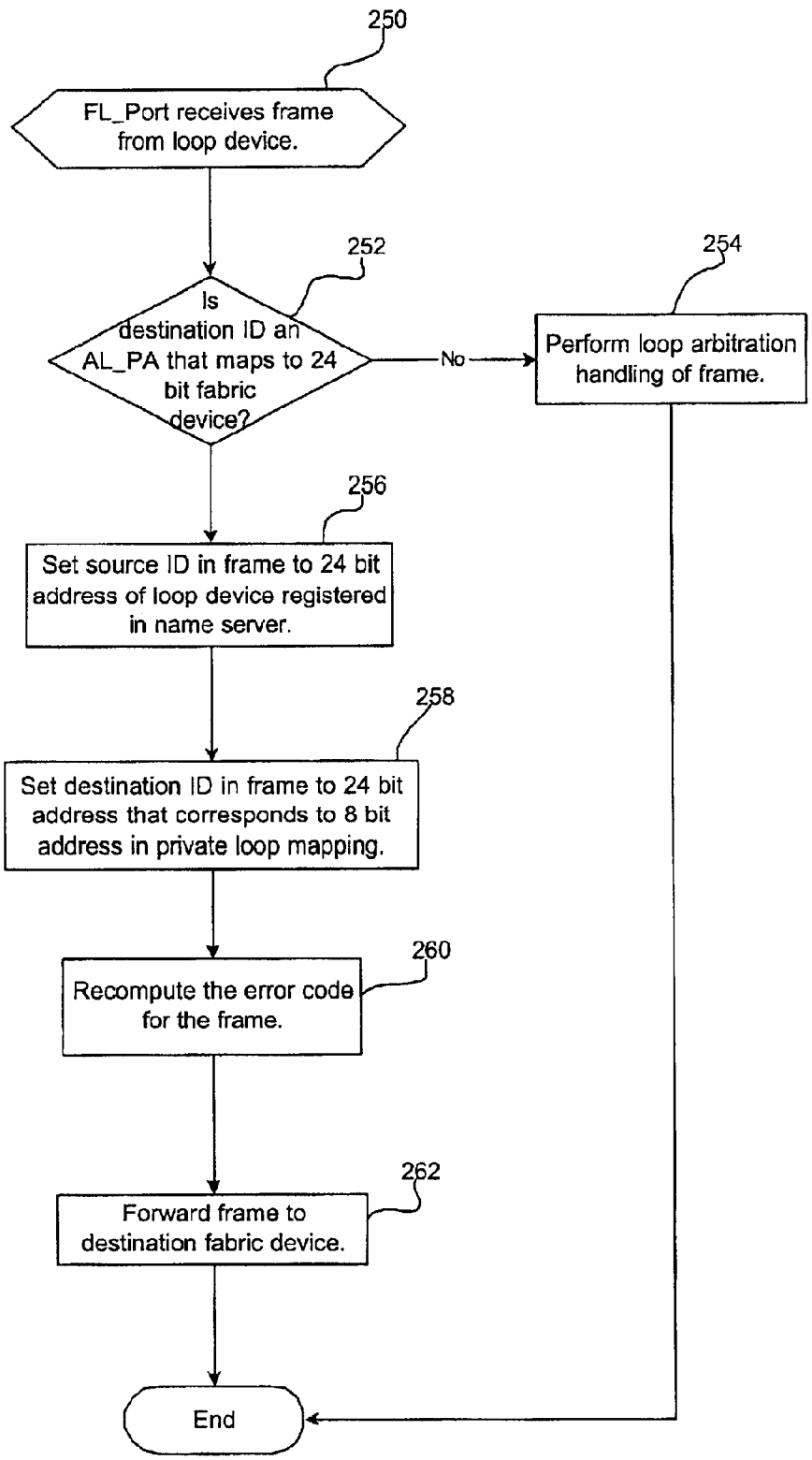

FIG. 8 illustrates logic implemented in the FL_Port 6e to process a frame received from a loop device 12a, b, c, d at block 250. If (at block 252) the destination device is a private loop device 12a, b, c, d, i.e., the private loop mapping 20 does not provide a 24 bit address for the 8 bit destination ID 56 address, then the FL_Port 6e (at block 254) performs a loop arbitration handling of the frame as a transmission between the loop devices 12a, b, c, d in the private loop 10 in a manner known in the art. Otherwise, if the destination is a fabric device 8a, b, c, d, i.e., the private loop mapping 20 does provide a correspondence of a 24 bit address to the 8 bit AL_PA address of the destination fabric device 12a, b, c, d, then the FL_Port 6e sets (at block 256) the source ID 58 in the frame to the 24 bit address of the private loop device 12a, b, c, d registered in the name server 16. The FL_Port 6e can convert the 8 bit private loop device 12a, b, c, d address to the 24 bit address by adding the area and domain values for the private loop 10 to the area and domain fields, or upper 16 bits, of the loop device 12a, b, c, d address, which would be the same area and domain fields or upper 16 bits of the FL_Port 6e 24 bit address registered with the name server 16. The destination ID 56 in the frame is set (at block 258) to the 24 bit address the private loop mapping 20 provides for the 8 bit destination address. The FL_Port 6e recomputes (at block 260) the redundancy check code (CRC) 62 (FIG. 4) with the added 24 bit destination 56 and source 58 IDs and forwards (at block 262) the modified frame to the destination fabric device 8a, b, c, d in a manner known in the art.

With the logic of FIGS. 5, 6, 7, and 8 the FL_Port 6e provides a mapping and translation of the fabric device 24 bit addresses to 8 bit addresses in the private loop 10 to allow fabric devices 8a, b, c, d to engage in bidirectional communication with the loop devices 12a, b, c, d. With the implementations described with respect to FIGS. 5, 6, 7, and 8, the FL_Port 6e allows fabric device 8a, b, c, d to establish communication with private loop devices 12a, b, c, d without disrupting the private loop 10 and devices 12a, b, c, d attached thereto. The logic of FIGS. 5–8 does not cause a loop initialization (LIP) to occur at the private loop 10 that would disrupt the operations of the private loop devices 12a, b, c, d. There is no disruption because fabric devices seeking access to the private loop 10 utilize an open AL_PA address to establish communication. This assigned AL_PA address is then placed in the AL_PA bitmap 22 for the loop devices 12a, b, c, d to reference for communication with a fabric device 8a, b, c, d.

In certain implementations, the private loop mapping 20 remains effective until a loop initialization process (LIP) occurs on the private loop 10. Occurrence of a LIP on the private loop 10 would cause the FL_Port 6e to invalidate all the mappings in the private loop mapping 20 and deliver registered state change notifications (RSCNs) to all fabric devices 8a, b, c, d that have registered to receive such notifications. Communication between the fabric devices 8a, b, c, d and the loop devices 12a, b, c, d would not be enabled until the FL_Port 6e initializes a new private loop mapping 20 between the fabric device 8a, b, c, d requesting access to the private loop 10 and a private loop AL_PA. Without the private lop mapping 20, the fabric devices 8a, b, c, d cannot communicate with loop devices 12a, b, c, d.

Using Dynamic Addressing to Enable Communication between the Fabric Devices and Private Loop In an additional implementation, the FL_Port 6e uses a dynamic mapping between an available 8 bit private loop 10 AL_PA and one of the fabric devices 8a, b, c, d to use for an exchange of frames between one fabric device 8a, b, c, d and one private loop device 8a, b, c, d. Once the exchange is completed, the AL_PA used in the completed exchange may be reallocated to use in a subsequent exchange, hence a dynamic mapping.

In the Fibre Channel protocol, an exchange is the fundamental mechanism for coordinating the exchange of information in the form of frames between ports. A sequence is a set of one or more related data frames, such as the data frame shown in FIG. 4, transmitted unidirectionally from one port to another. An exchange comprises one or more sequences flowing in a single direction from the originator node of the exchange to the responder node or in both directions between the originator and the responder. Both the originator and responder include codes within the frames to identify the frames as part of a particular exchange. The last data frame of an exchange is indicated using an end sequence bit in the last data frame of the sequence. Both the originator and responder in an exchange maintain a sequence status block (SSB) for each exchange to monitor the status of the exchange during transmission of sequences that are part of the exchange. The SSB would indicate whether an exchange is open or complete. Further details of a Fibre Channel exchange are described in the publication entitled "Fibre Channel Physical and Signaling Interface (FC-PH), Rev. 4.3", working draft proposal of ANSI (Jun. 1, 1994), which publication is incorporated herein by reference in its entirety.

Figure 9:
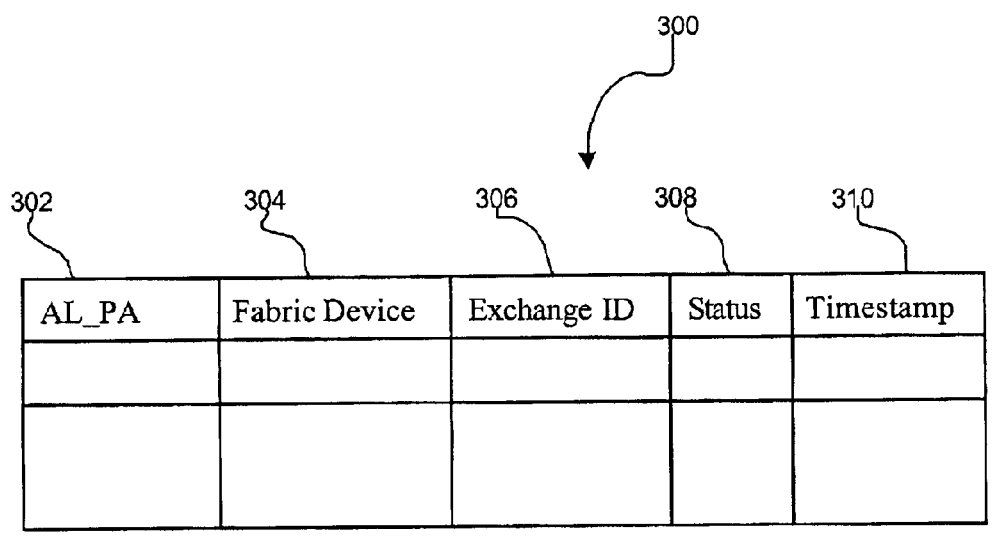
FIG. 9 illustrates one implementation of a dynamic address mapping in accordance with certain implementations of the invention.

As discussed, the FL_Port 6e maintains an AL_PA bitmap 22 indicating AL_PAs available for use. FIG. 9 illustrates a dynamic mapping block 300 used in the dynamic address assignment implementation. The dynamic mapping block 300 provides information for each AL_PA assigned to a fabric device 8a, b, c, d to use during an exchange with one of the private loop devices 12a, b, c, d. For each AL_PA assigned to a fabric device 8a, b, c, d, the private loop mapping 300 includes:

- AL_PA field 302 identifies the private loop AL_PA 302 used in the mapping.
- Fabric device field 304 provides the 24 bit address of the fabric device 8a, b, c, d that uses the AL_PA identified in the AL_PA field 302.
- Exchange ID 306 provides a unique identifier of the exchange for which the AL_PA was assigned. This unique identifier may comprise the originator exchange identifier (OX_ID) the fabric device 8a, b, c, d would include in each frame of the exchange.
- Status 308: indicates whether the AL_PA entry for the exchange ID 306 for which the AL_PA was assigned is complete or active. The FL_Port 6e may detect the completion or end of an exchange when finding the end sequence bit in the last data frame of a sequence.
- Timestamp 310: indicates a time associated with the exchange, such as the time the exchange began or was completed. This timestamp is used when there are no available AL_PA addresses in order to select a least recently completed or inactive AL_PA. In one described implementation, the timestamp is set to a current time code when the status field for the exchange is set to complete, indicating the time the AL_PA was last used in an exchange.

In one implementation, after the FL_Port 6(e) performs a loop initialization on the private loop 10, one or more AL_PAs may be available because they were not assigned to the private loop devices 12a, b, c, d during loop initialization. Such available AL_PAs may be used in the dynamic mapping. The FL_Port 6e would then perform a PLOGI to each of the private loop devices 12a, b, c, d for each of the available AL_PAs to discover the private loop devices 12a, b, c, d for each of the available AL_PAs. The purpose of this operation is to establish sessions with all the private loop devices 12a, b, c, d for each of the available AL_PA addresses. Thus, when an available AL_PA is assigned to a fabric device 8a, b, c, d to use to communicate with a private loop device 12a, b, c, d, a logical session is already established between the assigned AL_PA and the active private loop devices 12a, b, c, d.

In certain implementations, the FL_Port 6e could build the dynamic mapping block 300 to include an entry for each of the available AL_PAS, i.e., those AL_PAs not used or assigned during the private loop 10 initialization. The FL_Port 6e would initialize the dynamic mapping block 300 with one entry for each available AL_PA having the AL_PA field 302 set to one available AL_PA. The status field 308 for each available AL_PA could be initialized to completed, indicating that no current exchange is using the AL_PA, and the other fields 304, 306, and timestamp 310 could be initialized as empty or with some default value. In the described implementations, the "complete" status indicates that the AL_PA is available for allocation to an exchange.

Figure 10:
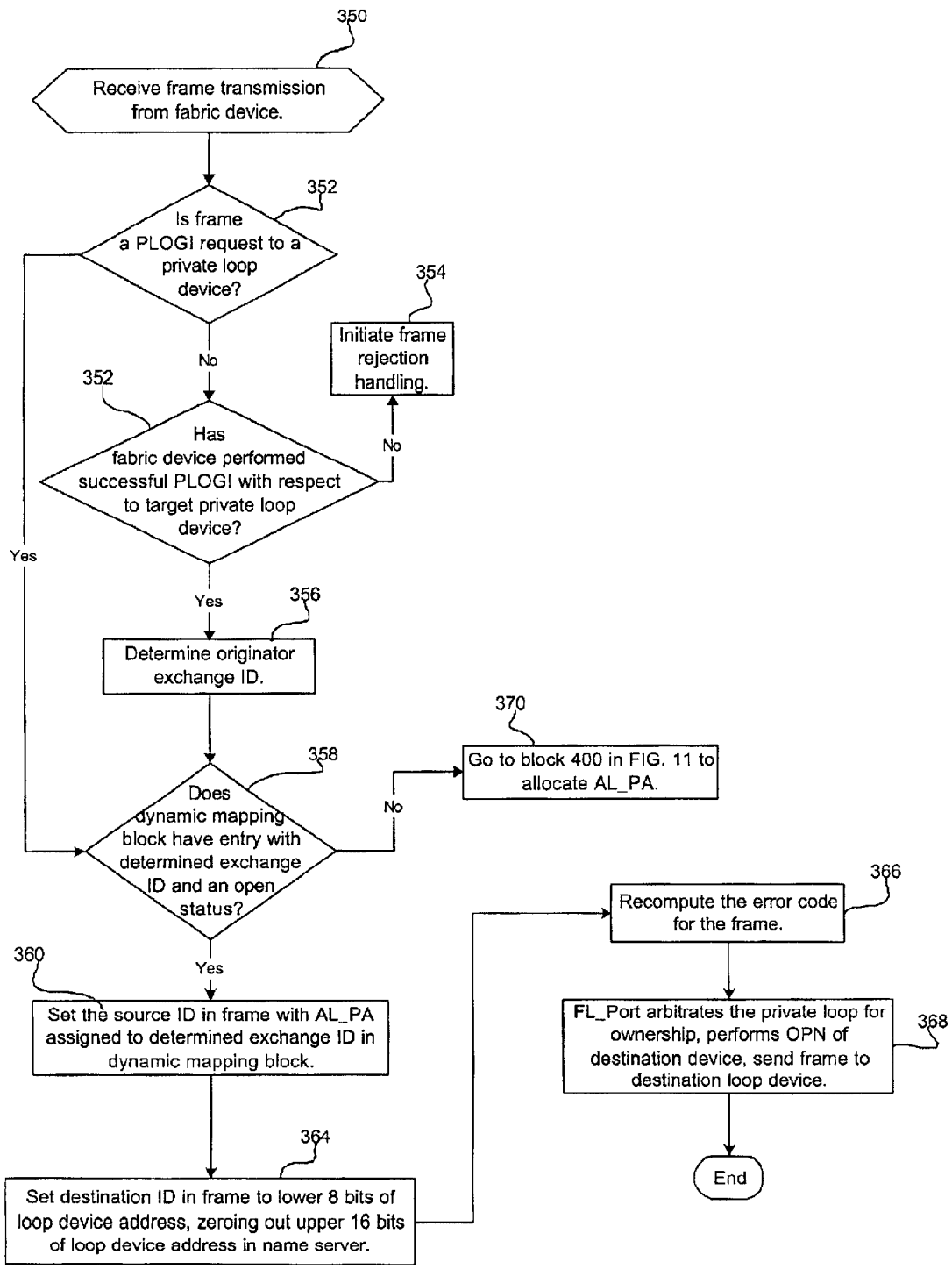
FIGS. 10–12 illustrates logic implemented in the switch port to dynamically assign addresses to enable communication between fabric devices and private loop devices in accordance with certain implementations of the invention.

FIG. 10 illustrates logic implemented in the FL_Port 6e to assign private loop AL_PA addresses to fabric devices 8a, b, c, d as part of the dynamic implementation. Control begins at block 350 with the FL_Port 6e receiving a frame transmission from one fabric device 8a, b, c, d. If (at block 352) the frame does not comprise a PLOGI request from the fabric device 8a, b, c, d to discover a target private loop device 12a, b, c, d, then the FL_Port 63 determines (at block 352) whether the transmitting fabric device 8a, b, c, d has already performed a successful PLOGI with respect to the target private loop device 12a, b, c, d. In the described implementations, the FL_Port 6e maintains the state of all successful PLOGIs. If not, then the FL_Port 6e initiates (at block 354) frame rejection handling. As discussed, rejection handling may involve returning some code indicating that the switch 4 cannot deliver the frame or taking no action and letting the source fabric device 8a, b, c, d timeout. For instance, in one implementation, if the PLOGI request is for a class service other than class 3, then the FL_Port 6e may return an F_RJT code to the source fabric device 8a, b, c, d indicating that the frame is not acceptable. If the class service included in the PLOGI request is class 3, then the FL_Port 6e would ignore the request. A class 3 service does not require acknowledgment of frame delivery, unlike other class levels that require acknowledgment of frame delivery.

If (at block 352) a successful PLOGI was previously performed by the fabric device 8a, b, c, d with respect to the target private loop device 12a, b, c, d, then the FL_Port 6e determines (at block 356) the originator exchange ID (OX_ID) within the frame header 54 (FIG. 4). In the described implementations, the originator exchange ID is used to uniquely identify an exchange. In alternative implementations, different or additional information may be used to uniquely identify an exchange. If (at block 358) the dynamic mapping block 300 has an entry with the determined exchange ID, e.g., OX_ID, and an "open" or "active" status indicating that the AL_PA in the entry is currently used in an active exchange, then the FL_Port 6e replaces (at block 360) the source ID 58 (FIG. 4) in the received frame with the AL_PA assigned to the determined exchange ID 306 in the dynamic mapping block 300. The FL_Port 6e further sets (at block 364) the destination ID 56 in the received frame to the lower eight bits of the private loop device address in the destination ID 56 field, zeroing out the upper 16 bits, thereby using the lower eight bits of the 24 bit address of the target private loop device 12a, b, c, d registered in the name server 16 (FIG. 3). The redundancy check code (CRC) 62 (FIG. 4) is recomputed (at block 366) with the new 8 bit destination 56 and source 58 IDs. At block 368, the FL_Port 6e then arbitrates the private loop 10 to obtain ownership of the destination loop device 12a, b, c, d, opens the destination NL_Port 14a, b, c, d on the destination loop device 12a, b, c, d, and then delivers the frame.

Figure 11:
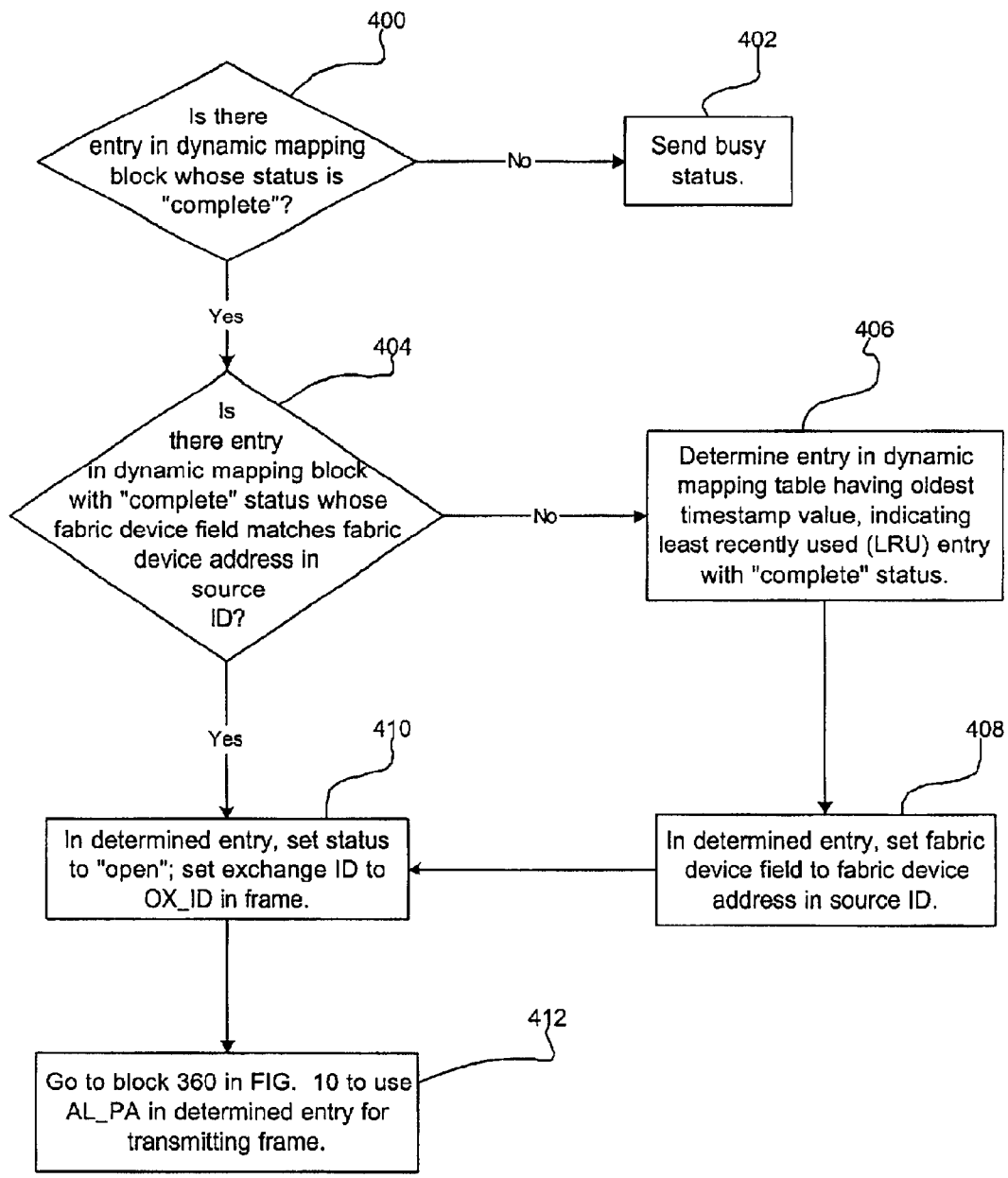

If (at block 358) the dynamic mapping block 300 does not have an entry with the exchange ID field 306 set to the determined exchange ID 306 and with "open" status 308, then the FL_Port 6e proceeds (at block 370) to block 400 in FIG. 11 to allocate one available AL_PA on the private loop 10. At block 400, the FL_Port 6e determines whether there is an entry in the dynamic mapping block 300 whose status field 308 is "complete", indicating that the AL_PA for the entry is not allocated to an active exchange. If there is no entry in the dynamic mapping block 300 having a "complete" status, then the FL_Port 6e sends (at block 402) a busy status to the source fabric device 8a, b, c, d that transmitted the frame. For instance, if the request is not a class 3 service, then the FL_Port 6e would return busy. Otherwise if the submitted frame is at a class 3 service level, then the FL_Port 63 may ignore the requested frame and let the request timeout.

If there is an entry in the dynamic mapping block 300 having "complete" status, then the FL_Port 6e determines (at block 404) whether there is an entry with the "complete"

status whose fabric device field 304 matches the address of the fabric device 8*a, b, c, d* transmitting the frame, which is indicated in the source ID 58 in the header 54 (FIG. 4). If there is an entry that has "complete" status that was previously allocated to the transmitting fabric device 8*a, b, c, d*, then that AL__PA previously used by the source fabric device 8*a, b, c, d* is reused for the current exchange. In this way, the FL__Port 6*e* prefers to use an AL__PA for a fabric device 8*a, b, c, d* exchange that was previously used to represent that fabric device 8*a, b, c, d* in the private loop 10 in a previous exchange. To reuse the AL__PA, the status field 308 in the determined entry in the dynamic mapping block 300 is set (at block 410) to "open" and the exchange ID field 306 is set to the originator exchange ID (OX__ID) in the transmitted frame. Control then proceeds (at block 412) to block 360 in FIG. 10 to modify the fields in the frame to use the AL__PA in the determined entry allocated to the exchange.

If (at block 404) there is no entry in the dynamic mapping block 300 having complete status and a fabric device field 304 matching the source fabric device 8*a, b, c, d*, i.e., the AL__PA previously used to represent the fabric device 8*a, b, c, d* is not available or there is no such previous AL__PA, then the FL__Port 6*e* determines (at block 406) an entry in the dynamic mapping table 300 having the oldest timestamp 310 value and "complete" status, indicating the least recently used or allocated entry. The FL__Port 6*e* then sets (at block 408) the fabric device field 304 to the address of the source fabric device 8*a, b, c, d* in the source ID field 58 of the frame and proceeds to block 410 to allocate that least recently allocated entry to the source fabric device 8*a, b, c, d* for the current exchange. In this way, the FL__Port 6*e* reuses the least recently allocated and available AL__PA for the requesting fabric device 8*a, b, c, d* so that those available AL__PAs that are not the least recently used are available for reallocation to the fabric device 8*a, b, c, d* that previously used them.

The FL__Port 6*e* may use techniques other than a timestamp to select the least recently allocated and available AL__PA. For instance, the FL__Port 6*e* may maintain AL__PAs in an ordered list, such that whenever allocating an AL__PA to a fabric device 8*a, b, c, d*, that allocated AL__PA entry is moved to the top of the list. In this way, the AL__PA entries at the bottom of the list are the least recently used or allocated entries.

Figure 12:
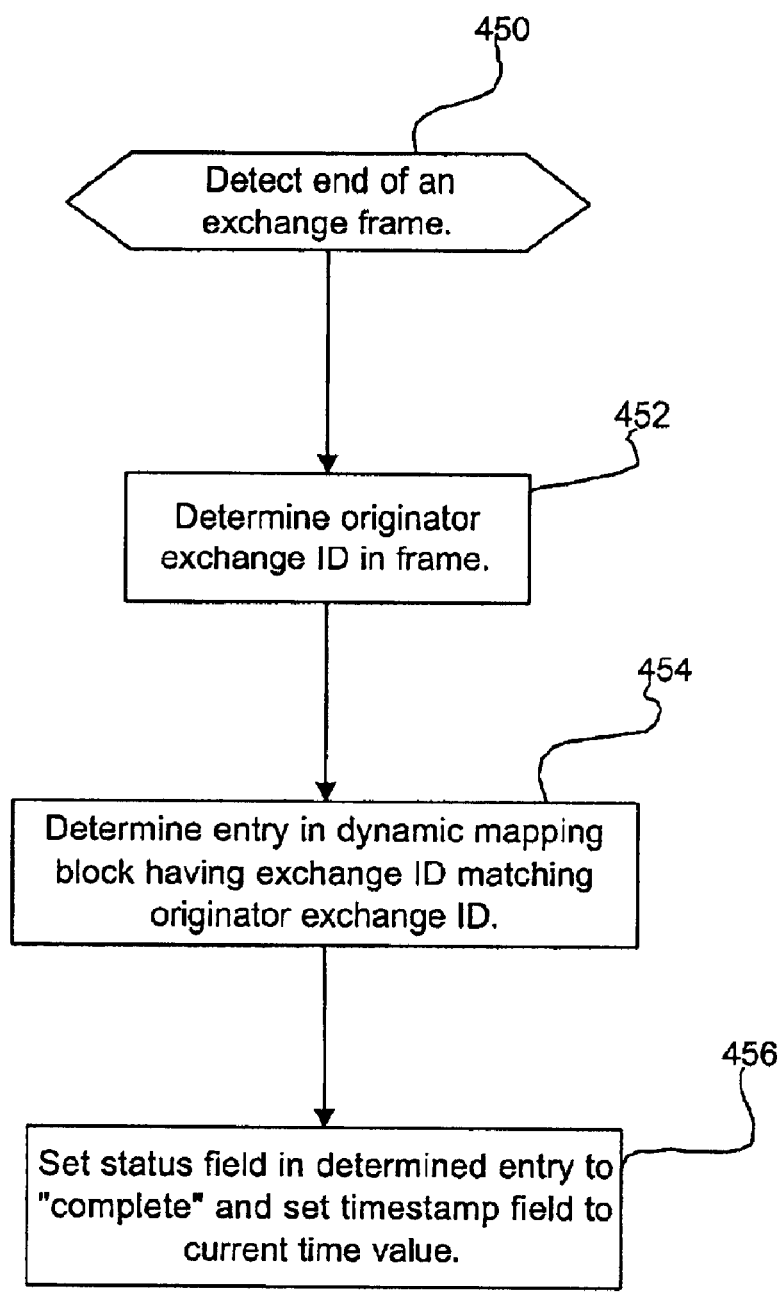

FIG. 12 illustrates logic implemented in the FL__Port 6*e* to update the status of the AL__PA entries in the dynamic mapping block 300. At block 450, the FL__Port 6*e* detects a code in a frame indicating the termination of an exchange, such as an end of sequence bit. In Fibre Channel implementations, the FL__Port 6*e* would monitor the frames for the end of sequence bit when using the exchange status blocks known in the art to track the process of an exchange. Upon detecting the frame with the end of sequence bit, the FL__Port 6*e* determines (at block 452) the originator exchange ID (OX__ID), which in certain implementations is used as the unique exchange ID. The FL__Port 6*e* then determines (at block 454) the entry in the dynamic mapping block 300 having the determined OX__ID as the exchange ID 306. The status field 308 in the determined entry is then set (at block 456) to "complete", thereby indicating that this AL__PA is available for allocation for another exchange. The timestamp field 310 would be set to the current time value, indicating the time the exchange completed. Alternatively, the timestamp may be set at the time of allocation, when the status field is set to "open."

The described dynamic implementations provide a technique for allocating AL__PAs for the duration of an exchange. Once the exchange completes, the private loop AL__PA is then available for a subsequent fabric device 8*a, b, c, d* exchange with a private loop device 12*a, b, c, d*. With this dynamic implementation, a limited number of AL__PAs may be used for an unlimited number of exchanges, thus increasing the likelihood that an AL__PA is available for allocation to a fabric device 8*a, b, c, d* at any given time. This is especially useful in current Fibre Channel private loop implementations where there are a limited number of AL__PAs available for private loop devices, currently limited to 127.

Additional Implementation Details

The technique for enabling communication between network devices described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Certain operations were described as performed by fabric controller 18 and FL__Port 6*e*. Alternatively, the operations described with respect to the fabric controller 18 and FL__Port 6*e* may be performed by other components of the switch 4. For instance, the mapping operations described as performed by the FL__Port 6*e* may be performed by some other components within the switch 4.

The described implementations provide a mapping technique used in a Fibre Channel architecture protocol to allow communication between devices using 24 bit addressing to devices that use 8 bit addressing. However, those skilled in the art will appreciate that the address mapping technique of the described implementations may be utilized with network transmission protocols other than Fibre Channel when groups of devices in the network use different addressing schemes. Accordingly, the invention is not limited to the Fibre Channel protocol environment, but may also be used to provide a mapping technique in non-Fibre Channel environments.

In described implementations, a mapping was provided between 8 bit and 24 bit addresses. In alternative implementations, the mapping may provide correspondence of address formats other than a correspondence of 24 to 8 bit address formats. Thus, implementations are not limited to an 8 to 24 bit address mapping.

In the described implementations, the mapping is established whenever the fabric device submits a PLOGI request to discover the service parameters of the private loop device 12a, b, c, d. In alternative implementations, the mapping may be established during another type of operation between the fabric and loop device.

In the described Fibre Channel protocol, data is communicated between devices in frames, including different fields, that conform to the Fibre Channel frame protocol. In alternative implementations, the frames comprising the data communicated between devices may be implemented in alternative formats according to other network communication protocols known in the art.

The topology of FIG. 3 is provided for illustration. The described address mapping implementations may apply to any fabric topology involving any number of interconnected switches, fabric devices, public and private loops, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for enabling communication between one network device that is a member of a first set of network devices that communicate using a first address format and one network device that is a member of a second set of network devices that communicate using a second address format, comprising:

receiving one frame from a first network device in the first set, wherein the frame is part of a first exchange of multiple frames between the first network device and one network device in the second set;

allocating a first address in the second address format to the first network device to use to communicate during the first exchange of the frames;

receiving one frame from a second network device that is a member of the first set pursuant to a second exchange of multiple frames between the second network device and one network device in the second set; and allocating one address in the second address format to the second network device to use to communicate during the second exchange of frames, wherein the address in the second address format allocated to the second network device is capable of comprising the first address or a second address in the second address format.

2. The method of claim 1, wherein allocating the address in the second address format to one exchange further comprises:

indicating that the allocated address is assigned to the exchange; and after the exchange has completed, indicating that the allocated address is not allocated to one active exchange, wherein the address indicated as not allocated to one active exchange is capable of being allocated to a subsequent exchange.

3. The method of claim 1, further comprising:

determining whether the first exchange has completed, wherein the first address allocated to the first exchange is not allocated to the second network device for the second exchange if the first exchange has not completed; and allocating the second address in the second address format to the second network device for the second exchange if the first exchange has not completed.

4. The method of claim 2, further comprising:

returning busy in response to the frame from the third network device if there is no available address in the second format that is not allocated to one active exchange.

5. The method of claim 2, further comprising:

determining one address in the second format that was least recently allocated to one active exchange, wherein the second address allocated to the second exchange is the least recently allocated address.

6. The method of claim 2, further comprising:

determining whether one available address in the second address format not allocated to one active exchange was previously allocated to the second network device during one previous exchange; and if one available address in the second format was allocated to the second network device during one previous exchange, then using the previously allocated available address as the second address for the second exchange.

7. The method of claim 6, further comprising:

if there is no available no address in the second format previously allocated to the second network device, then using one available address in the second format that is not allocated to one active exchange as the second address for the second exchange.

8. The method of claim 7, further comprising:

determining one available address in the second format that was least recently allocated to one active exchange, wherein the determined least recently allocated address is used as the second address if there is no available address in the second format that was previously allocated to the second network device.

9. The method of claim 1, wherein using one allocated address in the second format for the frames in one exchange, comprises:

determining an exchange identifier included in each frame in the exchange, wherein each frame further indicates a source and destination network device address in the first address format;

determining the address in the second format allocated to the source network device for the exchange identifier; and setting the source network device address to the determined address in the second format.

10. The method of claim 9, further comprising:

transforming the destination address in the first address format to the second address format; and transmitting the frame including the first and second network device addresses in the second address format to the second network device.

11. The method of claim 10, wherein the step of transforming the address bits in the destination address to the second address format comprises zeroing out bits in the first network device address in the first address format.

12. The method of claim 1, wherein the step of allocating the address in the second format to the exchange further comprises associating the allocated address to one network device in the first set and the exchange originated by the network device in the first set.

13. The method of claim 1, further comprising:
performing an initialization of the network devices in the second set; and
determining addresses in the second format not assigned to the network devices in the second set during the initialization, wherein the determined addresses are the addresses capable of being allocated to one network device in the first set to use during one exchange.

14. The method of claim 1, wherein the second set of network devices comprises an arbitrated loop attached to a switch, and wherein the first and second network devices are capable of communicating via one port on the switch.

15. The method of claim 14, wherein the network devices and switch communicate using the Fibre Channel protocol and wherein the arbitrated loop comprises a private arbitrated loop.

16. The method of claim 14, wherein the switch includes a port to which the arbitrated loop is connected, wherein the port allocates the addresses in the second format to exchanges and receives the frames from the network devices in the second set.

17. A system for enabling communication between one network device that is a member of a first set of network devices that communicate using a first address format and one network device that is a member of a second set of network devices that communicate using a second address format, comprising:
means for receiving one frame from a first network device in the first set, wherein the frame is part of a first exchange of multiple frames between the first network device and one network device in the second set;
means for allocating a first address in the second address format to the first network device to use to communicate during the first exchange of the frames;
means for receiving one frame from a second network device that is a member of the first set pursuant to a second exchange of multiple frames between the second network device and one network device in the second set; and
means for allocating one address in the second address format to the second network device to use to communicate during the second exchange of frames, wherein the address in the second address format allocated to the second network device is capable of comprising the first address or a second address in the second address format.

18. The system of claim 17, wherein the means for allocating the address in the second address format to one exchange further performs:
indicating that the allocated address is assigned to the exchange; and
after the exchange has completed, indicating that the allocated address is not allocated to one active exchange, wherein the address indicated as not allocated to one active exchange is capable of being allocated to a subsequent exchange.

19. The system of claim 17, further comprising:
means for determining whether the first exchange has completed, wherein the first address allocated to the first exchange is not allocated to the second network device for the second exchange if the first exchange has not completed; and
means for allocating the second address in the second address format to the second network device for the second exchange if the first exchange has not completed.

20. The system of claim 18, further comprising:
means for returning busy in response to the frame from the third network device if there is no available address in the second format that is not allocated to one active exchange.

21. The system of claim 18, further comprising:
means for determining one address in the second format that was least recently allocated to one active exchange, wherein the second address allocated to the second exchange is the least recently allocated address.

22. The system of claim 18, further comprising:
means for determining whether one available address in the second address format not allocated to one active exchange was previously allocated to the second network device during one previous exchange; and
means for using the previously allocated available address as the second address for the second exchange if one available address in the second format was allocated to the second network device during one previous exchange.

23. The system of claim 21, further comprising:
means for using one available address in the second format that is not allocated to one active exchange as the second address for the second exchange if there is no available address in the second format previously allocated to the second network device.

24. The system of claim 23, further comprising:
means for determining one available address in the second format that was least recently allocated to one active exchange, wherein the determined least recently allocated address is used as the second address if there is no available address in the second format that was previously allocated to the second network device.

25. The system of claim 17, wherein the means for using one allocated address in the second format for the frames in one exchange performs:
determining an exchange identifier included in each frame in the exchange, wherein each frame further indicates a source and destination network device address in the first address format;
determining the address in the second format allocated to the source network device for the exchange identifier; and
setting the source network device address to the determined address in the second format.

26. The system of claim 25, further comprising:
means for transforming the destination address in the first address format to the second address format; and
means for transmitting the frame including the first and second network device addresses in the second address format to the second network device.

27. The system of claim 26, wherein transforming the address bits in the destination address to the second address format zeroes out bits in the first network device address in the first address format.

28. The system of claim 17, wherein the means for allocating the address in the second format to the exchange further performs associating the allocated address to one network device in the first set and the exchange originated by the network device in the first set.

29. The system of claim 17, further comprising:
means for performing an initialization of the network devices in the second set; and
means for determining addresses in the second format not assigned to the network devices in the second set during the initialization, wherein the determined addresses are the addresses capable of being allocated to one network device in the first set to use during one exchange.

30. The system of claim 17, wherein the second set of network devices comprises an arbitrated loop attached to a switch, and wherein the first and second network devices are capable of communicating via one port on the switch.

31. The system of claim 30, wherein the network devices and switch communicate using the Fibre Channel protocol and wherein the arbitrated loop comprises a private arbitrated loop.

32. The system of claim 30, wherein the switch includes a port to which the arbitrated loop is connected, wherein the port allocates the addresses in the second format to exchanges and receives the frames from the network devices in the second set.

33. A network system, comprising:
a first set of network devices that communicate using a first address format;
a second set of network devices that communicate using a second address format;
a switch enabling communication between network devices in the first and second sets that implements logic to perform:
(i) receiving one frame from a first network device in the first set, wherein the frame is part of a first exchange of multiple frames between the first network device and one network device in the second set;
(ii) allocating a first address in the second address format to the first network device to use to communicate during the first exchange of the frames;
(iii) receiving one frame from a second network device that is a member of the first set pursuant to a second exchange of multiple frames between the second network device and one network device in the second set; and
(iv) allocating one address in the second address format to the second network device to use to communicate during the second exchange of frames, wherein the address in the second address format allocated to the second network device is capable of comprising the first address or a second address in the second address format.

34. The network system of claim 33, wherein the switch logic for allocating the address in the second address format to one exchange further performs:
indicating that the allocated address is assigned to the exchange; and
after the exchange has completed, indicating that the allocated address is not allocated to one active exchange, wherein the address indicated as not allocated to one active exchange is capable of being allocated to a subsequent exchange.

35. The network system of claim 33, wherein the switch logic further performs:
determining whether the first exchange has completed, wherein the first address allocated to the first exchange is not allocated to the second network device for the second exchange if the first exchange has not completed; and
allocating the second address in the second address format to the second network device for the second exchange if the first exchange has not completed.

36. The network system of claim 33, wherein using one allocated address in the second format for the frames in one exchange, comprises:

determining an exchange identifier included in each frame in the exchange, wherein each frame further indicates a source and destination network device address in the first address format;
determining the address in the second format allocated to the source network device for the exchange identifier; and
setting the source network device address to the determined address in the second format.

37. The network system of claim 36, wherein the switch logic further performs:
transforming the destination address in the first address format to the second address format; and
transmitting the frame including the first and second network device addresses in the second address format to the second network device.

38. The network system of claim 33, wherein the switch logic further performs:
performing an initialization of the network devices in the second set; and
determining addresses in the second format not assigned to the network devices in the second set during the initialization, wherein the determined addresses are the addresses capable of being allocated to one network device in the first set to use during one exchange.

39. The network system of claim 33, wherein the second set of network devices are attached on an arbitrated loop that is attached to the switch, and wherein the switch further includes one port through which network devices in the first and second sets can communicate.

40. The network system of claim 39, wherein the network devices and switch communicate using the Fibre Channel protocol and wherein the arbitrated loop comprises a private arbitrated loop.

41. The network system of claim 39, wherein the port implements the logic that allocates the addresses in the second format to exchanges and receives the frames from the network devices in the second set.

42. An article of manufacture for enabling communication between one network device that is a member of a first set of network devices that communicate using a first address format and one network device that is a member of a second set of network devices that communicate using a second address format, by:
receiving one frame from a first network device in the first set, wherein the frame is part of a first exchange of multiple frames between the first network device and one network device in the second set;
allocating a first address in the second address format to the first network device to use to communicate during the first exchange of the frames;
receiving one frame from a second network device that is a member of the first set pursuant to a second exchange of multiple frames between the second network device and one network device in the second set; and
allocating one address in the second address format to the second network device to use to communicate during the second exchange of frames, wherein the address in the second address format allocated to the second network device is capable of comprising the first address or a second address in the second address format.

43. The article of manufacture of claim 42, wherein allocating the address in the second address format to one exchange further comprises:

indicating that the allocated address is assigned to the exchange; and after the exchange has completed, indicating that the allocated address is not allocated to one active exchange, wherein the address indicated as not allocated to one active exchange is capable of being allocated to a subsequent exchange.

44. The article of manufacture of claim 42, further comprising:

determining whether the first exchange has completed, wherein the first address allocated to the first exchange is not allocated to the second network device for the second exchange if the first exchange has not completed; and allocating the second address in the second address format to the second network device for the second exchange if the first exchange has not completed.

45. The article of manufacture of claim 43, further comprising:

returning busy in response to the frame from the third network device if there is no available address in the second format that is not allocated to one active exchange.

46. The article of manufacture of claim 43, further comprising:

determining one address in the second format that was least recently allocated to one active exchange, wherein the second address allocated to the second exchange is the least recently allocated address.

47. The article of manufacture of claim 43, further comprising:

determining whether one available address in the second address format not allocated to one active exchange was previously allocated to the second network device during one previous exchange; and if one available address in the second format was allocated to the second network device during one previous exchange, then using the previously allocated available address as the second address for the second exchange.

48. The article of manufacture of claim 47, further comprising:

if there is no available no address in the second format previously allocated to the second network device, then using one available address in the second format that is not allocated to one active exchange as the second address for the second exchange.

49. The article of manufacture of claim 48, further comprising:

determining one available address in the second format that was least recently allocated to one active exchange, wherein the determined least recently allocated address is used as the second address if there is no available address in the second format that was previously allocated to the second network device.

50. The article of manufacture of claim 42, wherein using one allocated address in the second format for the frames in one exchange, comprises:

determining an exchange identifier included in each frame in the exchange, wherein each frame further indicates a source and destination network device address in the first address format;

determining the address in the second format allocated to the source network device for the exchange identifier; and setting the source network device address to the determined address in the second format.

51. The article of manufacture of claim 50, further comprising:

transforming the destination address in the first address format to the second address format; and transmitting the frame including the first and second network device addresses in the second address format to the second network device.

52. The article of manufacture of claim 51, wherein the step of transforming the address bits in the destination address to the second address format comprises zeroing out bits in the first network device address in the first address format.

53. The article of manufacture of claim 42, wherein the step of allocating the address in the second format to the exchange further comprises associating the allocated address to one network device in the first set and the exchange originated by the network device in the first set.

54. The article of manufacture of claim 42, further comprising:

performing an initialization of the network devices in the second set; and determining addresses in the second format not assigned to the network devices in the second set during the initialization, wherein the determined addresses are the addresses capable of being allocated to one network device in the first set to use during one exchange.

55. The article of manufacture of claim 42, wherein the second set of network devices comprises an arbitrated loop attached to a switch, and wherein the first and second network devices are capable of communicating via one port on the switch.

56. The article of manufacture of claim 55, wherein the network devices and switch communicate using the Fibre Channel protocol and wherein the arbitrated loop comprises a private arbitrated loop.

57. The article of manufacture of claim 55, wherein the switch includes a port to which the arbitrated loop is connected, wherein the port allocates the addresses in the second format to exchanges and receives the frames from the network devices in the second set.

* * * * *